United States Patent
Diard

(10) Patent No.: US 9,171,350 B2
(45) Date of Patent: Oct. 27, 2015

(54) ADAPTIVE RESOLUTION DGPU RENDERING TO PROVIDE CONSTANT FRAMERATE WITH FREE IGPU SCALE UP

(75) Inventor: Franck Diard, Mountain View, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 1035 days.

(21) Appl. No.: 12/914,853

(22) Filed: Oct. 28, 2010

(65) Prior Publication Data

US 2012/0105452 A1    May 3, 2012

(51) Int. Cl.
  G09G 5/00   (2006.01)
  G06T 3/40   (2006.01)
  G09G 5/12   (2006.01)
  G09G 5/36   (2006.01)

(52) U.S. Cl.
  CPC .. G06T 3/40 (2013.01); G09G 5/12 (2013.01); G09G 5/363 (2013.01); G09G 2340/0407 (2013.01); G09G 2340/0435 (2013.01); G09G 2360/06 (2013.01)

(58) Field of Classification Search
  USPC ........ 348/14.11; 345/419, 156, 619; 715/765, 715/864; 709/226; 382/298; 386/68
  See application file for complete search history.

(56) References Cited

U.S. PATENT DOCUMENTS

| | | |
|---|---|---|
| 4,208,810 A | 6/1980 | Rohner et al. |
| 4,918,626 A | 4/1990 | Watkins et al. |
| 5,081,594 A | 1/1992 | Horsley |
| 5,212,633 A | 5/1993 | Franzmeier |
| 5,237,460 A | 8/1993 | Miller et al. |
| 5,287,438 A | 2/1994 | Kelleher |
| 5,313,287 A | 5/1994 | Barton |
| 5,432,898 A | 7/1995 | Curb et al. |
| 5,446,836 A | 8/1995 | Lentz et al. |
| 5,452,104 A | 9/1995 | Lee |
| 5,452,412 A | 9/1995 | Johnson, Jr. et al. |
| 5,483,258 A | 1/1996 | Cornett et al. |
| 5,543,935 A | 8/1996 | Harrington |
| 5,570,463 A | 10/1996 | Dao |
| 5,594,854 A | 1/1997 | Baldwin et al. |
| 5,623,692 A | 4/1997 | Priem et al. |
| 5,633,297 A | 5/1997 | Valko et al. |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

A Hardware Assisted Design Rule Check Architecture Larry Seller Jan. 1982 Proceedings of the 19th Conference on Design Automation DAC '82 Publisher: IEEE Press.

(Continued)

Primary Examiner — Phi Hoang

(57) ABSTRACT

Embodiments of the present invention are directed to provide novel methods and a system for adaptive resolution rendering via scaling in a multiple graphics processor system. A method is described herein that maintains a constant framerate by reducing the resolution of the graphical output rendered in one graphics processor and using another graphics processor in the same computing system to scale the already-rendered output to its original intended resolution when the framerate drops below a desired threshold.

20 Claims, 4 Drawing Sheets

(56) References Cited

U.S. PATENT DOCUMENTS

| | | |
|---|---|---|
| 5,664,162 A | 9/1997 | Dye |
| 5,734,744 A | 3/1998 | Wittenstein et al. |
| 5,742,607 A | 4/1998 | Beighe et al. |
| 5,790,705 A | 8/1998 | Anderson et al. |
| 5,815,162 A | 9/1998 | Levine |
| 5,854,631 A | 12/1998 | Akeley et al. |
| 5,854,637 A | 12/1998 | Sturges |
| 5,872,902 A | 2/1999 | Kuchkuda et al. |
| 5,977,987 A | 11/1999 | Duluk, Jr. |
| 6,003,083 A | 12/1999 | Davies et al. |
| 6,026,180 A | 2/2000 | Wittenstein et al. |
| 6,028,608 A | 2/2000 | Jenkins |
| 6,034,699 A | 3/2000 | Wong et al. |
| 6,072,500 A | 6/2000 | Foran et al. |
| 6,104,407 A | 8/2000 | Aleksic et al. |
| 6,104,417 A | 8/2000 | Nielsen et al. |
| 6,115,049 A | 9/2000 | Winner et al. |
| 6,118,394 A | 9/2000 | Onaya |
| 6,128,000 A | 10/2000 | Jouppi et al. |
| 6,137,918 A | 10/2000 | Harrington et al. |
| 6,160,557 A | 12/2000 | Narayanaswami |
| 6,160,559 A | 12/2000 | Omtzigt |
| 6,181,822 B1 | 1/2001 | Miller et al. |
| 6,188,394 B1 | 2/2001 | Morein et al. |
| 6,201,545 B1 | 3/2001 | Wong et al. |
| 6,204,859 B1 | 3/2001 | Jouppi et al. |
| 6,219,070 B1 | 4/2001 | Baker et al. |
| 6,249,853 B1 | 6/2001 | Porterfield |
| 6,259,460 B1 | 7/2001 | Gossett et al. |
| 6,323,874 B1 | 11/2001 | Gossett |
| 6,356,588 B1 | 3/2002 | Otto |
| 6,359,623 B1 | 3/2002 | Larson |
| 6,362,819 B1 | 3/2002 | Dalal et al. |
| 6,366,289 B1 | 4/2002 | Johns |
| 6,429,877 B1 | 8/2002 | Stroyan |
| 6,437,780 B1 | 8/2002 | Baltaretu et al. |
| 6,452,595 B1 | 9/2002 | Montrym et al. |
| 6,469,707 B1 | 10/2002 | Voorhies |
| 6,480,205 B1 | 11/2002 | Greene et al. |
| 6,501,564 B1 | 12/2002 | Schramm et al. |
| 6,504,542 B1 | 1/2003 | Voorhies et al. |
| 6,522,329 B1 | 2/2003 | Ihara et al. |
| 6,523,102 B1 | 2/2003 | Dye et al. |
| 6,525,737 B1 | 2/2003 | Duluk, Jr. et al. |
| 6,525,743 B1 * | 2/2003 | Patrick et al. ................. 345/619 |
| 6,529,207 B1 | 3/2003 | Landau et al. |
| 6,545,684 B1 | 4/2003 | Dragony et al. |
| 6,606,093 B1 | 8/2003 | Gossett et al. |
| 6,611,272 B1 | 8/2003 | Hussain et al. |
| 6,614,444 B1 | 9/2003 | Duluk, Jr. et al. |
| 6,614,448 B1 | 9/2003 | Garlick et al. |
| 6,624,823 B2 | 9/2003 | Deering |
| 6,633,197 B1 | 10/2003 | Sutardja |
| 6,633,297 B2 | 10/2003 | McCormack et al. |
| 6,646,639 B1 | 11/2003 | Greene et al. |
| 6,671,000 B1 | 12/2003 | Cloutier |
| 6,693,637 B2 | 2/2004 | Koneru et al. |
| 6,693,639 B2 | 2/2004 | Duluk, Jr. et al. |
| 6,697,063 B1 | 2/2004 | Zhu |
| 6,704,022 B1 | 3/2004 | Aleksic |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 | 5/2004 | Fenney |
| 6,745,385 B1 | 6/2004 | Lupu et al. |
| 6,747,057 B2 | 6/2004 | Ruzafa et al. |
| 6,765,575 B1 | 7/2004 | Voorhies et al. |
| 6,778,177 B1 | 8/2004 | Furtner |
| 6,788,301 B2 | 9/2004 | Thrasher |
| 6,798,410 B1 | 9/2004 | Redshaw et al. |
| 6,803,916 B2 | 10/2004 | Ramani et al. |
| 6,819,332 B2 | 11/2004 | Baldwin |
| 6,833,835 B1 | 12/2004 | van Vugt |
| 6,901,497 B2 | 5/2005 | Tashiro et al. |
| 6,906,716 B2 | 6/2005 | Moreton et al. |
| 6,938,176 B1 | 8/2005 | Alben et al. |
| 6,940,514 B1 | 9/2005 | Wasserman et al. |
| 6,947,057 B2 | 9/2005 | Nelson et al. |
| 6,956,579 B1 | 10/2005 | Diard et al. |
| 6,961,057 B1 | 11/2005 | Van Dyke et al. |
| 6,978,317 B2 | 12/2005 | Anantha et al. |
| 7,002,591 B1 | 2/2006 | Leather et al. |
| 7,009,607 B2 | 3/2006 | Lindholm et al. |
| 7,009,615 B1 | 3/2006 | Kilgard et al. |
| 7,039,241 B1 | 5/2006 | Van Hook |
| 7,061,495 B1 | 6/2006 | Leather |
| 7,061,640 B1 | 6/2006 | Maeda |
| 7,064,771 B1 | 6/2006 | Jouppi et al. |
| 7,075,542 B1 | 7/2006 | Leather |
| 7,081,902 B1 | 7/2006 | Crow et al. |
| 7,119,809 B1 | 10/2006 | McCabe |
| 7,126,600 B1 | 10/2006 | Fowler et al. |
| 7,154,066 B2 | 12/2006 | Talwar et al. |
| 7,158,148 B2 | 1/2007 | Toji et al. |
| 7,167,259 B2 | 1/2007 | Varga |
| 7,170,515 B1 | 1/2007 | Zhu |
| 7,184,040 B1 | 2/2007 | Tzvetkov |
| 7,224,364 B1 | 5/2007 | Yue et al. |
| 7,243,191 B2 | 7/2007 | Ying et al. |
| 7,307,628 B1 | 12/2007 | Goodman et al. |
| 7,307,638 B2 | 12/2007 | Leather et al. |
| 7,308,146 B2 | 12/2007 | Becker et al. |
| 7,382,368 B1 | 6/2008 | Molnar et al. |
| 7,453,466 B2 | 11/2008 | Hux et al. |
| 7,478,187 B2 | 1/2009 | Knepper et al. |
| 7,483,029 B2 | 1/2009 | Crow et al. |
| 7,548,996 B2 | 6/2009 | Baker et al. |
| 7,551,174 B2 | 6/2009 | Iourcha et al. |
| 7,565,028 B2 | 7/2009 | Saed |
| 7,633,506 B1 | 12/2009 | Leather et al. |
| 7,634,637 B1 | 12/2009 | Lindholm et al. |
| 7,791,617 B2 | 9/2010 | Crow et al. |
| 7,809,830 B2 * | 10/2010 | Denoual ........................ 709/226 |
| 7,965,902 B1 | 6/2011 | Zelinka et al. |
| 8,063,903 B2 | 11/2011 | Vignon et al. |
| 8,111,928 B2 | 2/2012 | Van Hook et al. |
| 8,411,942 B2 | 4/2013 | Chen et al. |
| 8,427,487 B1 | 4/2013 | Crow |
| 8,427,496 B1 | 4/2013 | Tamasi et al. |
| 8,773,443 B2 | 7/2014 | Diard |
| 2001/0005209 A1 | 6/2001 | Lindholm et al. |
| 2001/0040584 A1 | 11/2001 | Deleeuw |
| 2002/0050979 A1 | 5/2002 | Oberoi et al. |
| 2002/0061063 A1 | 5/2002 | Otto |
| 2002/0097241 A1 | 7/2002 | McCormack et al. |
| 2002/0130863 A1 | 9/2002 | Baldwin |
| 2002/0140655 A1 | 10/2002 | Liang et al. |
| 2002/0158885 A1 | 10/2002 | Brokenshire et al. |
| 2002/0196251 A1 | 12/2002 | Duluk, Jr. et al. |
| 2003/0067468 A1 | 4/2003 | Duluk, Jr. et al. |
| 2003/0076325 A1 | 4/2003 | Thrasher |
| 2003/0095155 A1 * | 5/2003 | Johnson ........................ 345/864 |
| 2003/0122815 A1 | 7/2003 | Deering |
| 2003/0163589 A1 | 8/2003 | Bunce et al. |
| 2003/0194116 A1 | 10/2003 | Wong et al. |
| 2003/0201994 A1 | 10/2003 | Taylor et al. |
| 2004/0085313 A1 | 5/2004 | Moreton et al. |
| 2004/0130552 A1 | 7/2004 | Duluk, Jr. et al. |
| 2004/0177338 A1 | 9/2004 | Fathalla |
| 2004/0183801 A1 | 9/2004 | Deering |
| 2004/0196285 A1 | 10/2004 | Rice et al. |
| 2004/0207642 A1 | 10/2004 | Crisu et al. |
| 2004/0246251 A1 | 12/2004 | Fenney et al. |
| 2005/0030314 A1 | 2/2005 | Dawson |
| 2005/0041037 A1 | 2/2005 | Dawson |
| 2005/0066148 A1 | 3/2005 | Luick |
| 2005/0122338 A1 | 6/2005 | Hong et al. |
| 2005/0134588 A1 | 6/2005 | Aila et al. |
| 2005/0134603 A1 | 6/2005 | Iourcha et al. |
| 2005/0152610 A1 | 7/2005 | Hagiwara et al. |
| 2005/0179698 A1 | 8/2005 | Vijayakumar et al. |
| 2005/0259100 A1 | 11/2005 | Teruyama |
| 2006/0010261 A1 | 1/2006 | Bonola et al. |
| 2006/0044317 A1 | 3/2006 | Bourd et al. |

(56) References Cited

U.S. PATENT DOCUMENTS

| | | | |
|---|---|---|---|
| 2006/0062490 A1* | 3/2006 | Ha et al. | 382/298 |
| 2006/0170690 A1 | 8/2006 | Leather | |
| 2006/0203005 A1 | 9/2006 | Hunter | |
| 2006/0215923 A1 | 9/2006 | Beatty | |
| 2006/0245001 A1 | 11/2006 | Lee et al. | |
| 2006/0267981 A1 | 11/2006 | Naoi | |
| 2007/0139440 A1 | 6/2007 | Crow et al. | |
| 2007/0171222 A1 | 7/2007 | Kowalski | |
| 2007/0179940 A1 | 8/2007 | Robinson et al. | |
| 2007/0268298 A1 | 11/2007 | Alben et al. | |
| 2007/0273689 A1 | 11/2007 | Tsao | |
| 2007/0296725 A1 | 12/2007 | Steiner et al. | |
| 2008/0024497 A1 | 1/2008 | Crow et al. | |
| 2008/0024522 A1 | 1/2008 | Crow et al. | |
| 2008/0100618 A1 | 5/2008 | Woo et al. | |
| 2008/0273218 A1 | 11/2008 | Kitora et al. | |
| 2009/0172707 A1 | 7/2009 | Huang et al. | |
| 2009/0225076 A1* | 9/2009 | Vlietinck | 345/419 |
| 2010/0013757 A1* | 1/2010 | Ogikubo | 345/156 |
| 2010/0247064 A1* | 9/2010 | Yeh et al. | 386/248 |
| 2011/0074915 A1* | 3/2011 | Ferren et al. | 348/14.11 |
| 2011/0164679 A1* | 7/2011 | Satou et al. | 375/240.03 |
| 2011/0194616 A1 | 8/2011 | He et al. | |
| 2011/0208507 A1* | 8/2011 | Hughes | 704/9 |
| 2012/0033586 A1* | 2/2012 | Jefremov | 370/260 |
| 2012/0066624 A1* | 3/2012 | Kwak et al. | 715/765 |

FOREIGN PATENT DOCUMENTS

| | | |
|---|---|---|
| JP | 10134198 | 5/1998 |
| JP | 11195132 | 7/1999 |
| JP | 2005182547 | 7/2005 |
| WO | 0013145 | 3/2000 |

OTHER PUBLICATIONS

A Parallel Alogorithm for Polygon Rasterization Juan Pineda Jun. 1988 ACM.

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press.

Blythe, OpenGL section 3.4.1, Basic Line Segment Rasterization, Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

Texas Instruments, TMS320VC5501/5502 DSP Direct Memory Access (DMA) Controller Reference Guide, Sections 1, 2, 4, 11, and 12, Literature number: SPRU613G.

\* cited by examiner

Exemplary Computer System 400

ADAPTIVE RESOLUTION DGPU RENDERING TO PROVIDE CONSTANT FRAMERATE WITH FREE IGPU SCALE UP

BACKGROUND

Graphics processing subsystems are used to perform graphics rendering in modern computing systems such as desktops, notebooks, and video game consoles, etc. Traditionally, graphics processing subsystems are implemented as either integrated graphics solutions or discrete video cards, and typically include one or more graphics processing units, or "GPUs," which are specialized processors designed to efficiently perform graphics processing operations Integrated graphics solutions are graphics processors that utilize a portion of a computer's system memory rather than having their own dedicated memory. Due to this arrangement, integrated graphics subsystems are typically localized in close proximity to, if not disposed directly upon, some portion of the main circuit board (e.g., a motherboard) of the computing system. Integrated graphics subsystems are, in general, cheaper to implement than discrete video cards, but typically have lower capability and operate at reduced performance levels relative to discrete graphics processing subsystems.

Discrete or "dedicated" video cards are distinguishable from integrated graphics solutions by having local memory dedicated for use by the graphics processing subsystem which is not shared with the underlying computer system. Commonly, discrete graphics processing subsystems are implemented on discrete circuit boards called "video cards" which include, among other components, one or more GPUs, the local memory, communication buses and various output terminals. These video cards typically interface with the main circuit board of a computing system through a standardized expansion slot such as PCI Express (PCIe) or Accelerated Graphics Port (AGP), upon which the video card may be mounted. In general, discrete graphics processing subsystems are capable of significantly higher performance levels relative to integrated graphics processing subsystems. However, discrete graphics processing subsystems also typically require their own separate power inputs, and require higher capacity power supply units to function properly. Consequently, discrete graphics processing subsystems also have higher rates of power consumption relative to integrated graphics solutions.

Some modern main circuit boards often include two or more graphics subsystems. For example, common configurations include an integrated graphics processing unit as well as one or more additional expansion slots available to add a dedicated graphics subsystem. For mobile computing devices implemented according to these configurations, typically only one of the graphics processing subsystems (generally the integrated graphics processing subsystem) will have an output terminal, typically with one or more ports corresponding to one or more audio/visual standards (e.g., VGA, HDMI, DVI, etc.), for connecting to a display device.

Typically, only one of the graphics processing subsystems will be running in the computing system at any one time, with heavier graphics processing loads being allocated to the dedicated or discrete graphics processing subsystem for processing. Since typical configurations do not include a direct display connection between the discrete graphics processing subsystem and a coupled display device, graphical output rendered by the discrete graphics processing subsystem is often stored in system memory, where it is retrieved by the integrated graphics processing subsystem and presented to the coupled display device in a "pipeline" arrangement.

In general, rendering at the highest framerates possible is preferable to the application's user or viewer. This is especially true for computing gaming applications. However, rendering at a constantly high framerates is not always possible as executing applications may be sending an ever changing amount of data to render. On many applications, the framerate may vary widely between scenes or even individuals frames between scenes, depending on the complexity of the scene being rendered. Naturally, experiencing large variance or inconsistencies in framerate is undesirable and may negatively impact the application user's viewing experience.

SUMMARY

Embodiments of the present invention are directed to provide novel methods and a system for adaptive resolution rendering via scaling in a multiple graphics processor system. A method is described herein that maintains a constant framerate by reducing the resolution of the graphical output rendered in one graphics processor and using another graphics processor in the same computing system to scale the already-rendered output to its original intended resolution when the framerate drops below a desired threshold. A method is also provided which allows for receiving graphics rendering instructions in appropriate graphics processing subsystems to reduce or increase the resolution of rendered output based on monitored framerate data generated by the GPUs corresponding to previously rendered frames or scenes. By referencing feedback data after each rendered scene or image, the framerate of successive loads may be maintained above a certain framerate to reduce framerates that drop below a threshold which may negatively affect a user's viewing experience.

One novel embodiment constantly monitors framerates of rendered graphical output of a first graphics processing system. If the framerate drops below a pre-determined threshold, the resolution of the graphical output rendered by the first graphics processing system is adaptively reduced, such that the framerate may remain above the threshold while still rendering as much area (in the form of resolution) as possible. If the resolution is downgraded as a result of a low framerate, the graphical output is scaled back to the original resolution in a second graphics processing system, such that the original resolution is maintained. Accordingly, this novel embodiment provides an ability to maintain a constant framerate at a constant resolution.

The above described novel embodiments feature the ability to provide a constant framerate and resolution in which output may be displayed to a user. In short, a user's graphical experience can be more consistently displayed in a computer system with multiple graphics processing resources.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
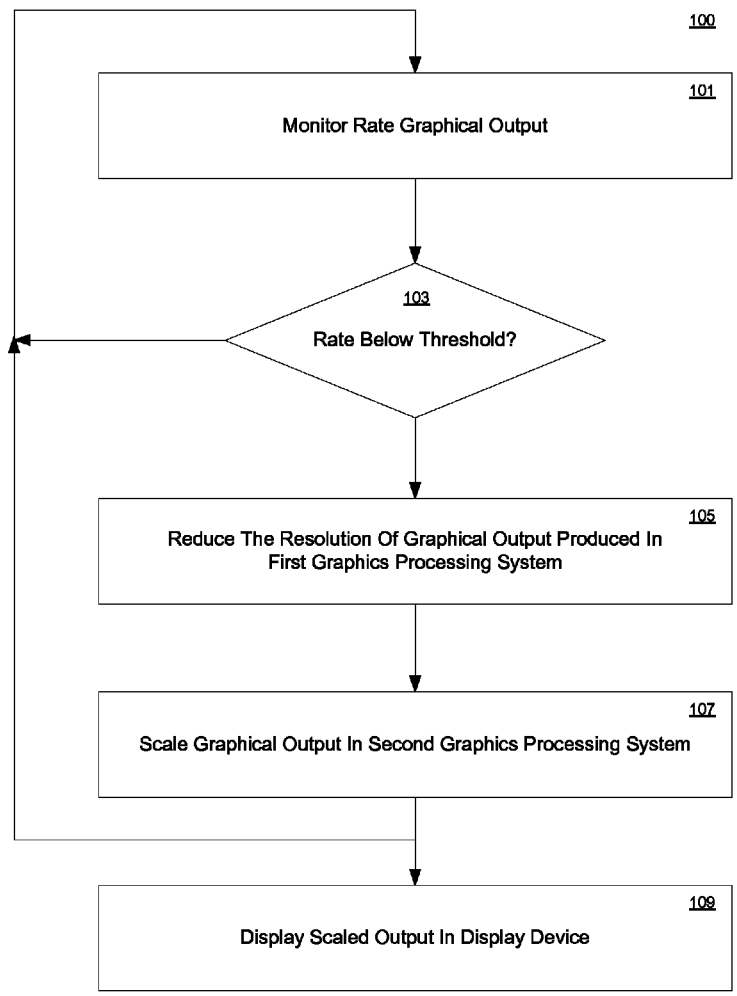
FIG. 1 depicts a flowchart of an exemplary computer controlled method for providing a constant framerate in a multi-graphics processor system, in accordance with various embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 1 and 2) describing the operations of this process, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Providing a Constant Framerate

FIG. 1 illustrates a flowchart of an exemplary method 100 for providing a constant framerate in a multi-graphics processor system, in accordance with embodiments of the present invention. Steps 101-109 describe exemplary steps comprising the process 100 in accordance with the various embodiments herein described. Process 100 may be performed in, for example, a system comprising one or more graphics processing subsystems, wherein one of the graphics processing subsystems is coupled to a plurality of display devices. In further embodiments, process 100 may be implemented as a series of computer-executable instructions.

In a typical embodiment, for example, a discrete graphics processor and an integrated graphics processor configuration are provided, wherein the integrated graphics processor is directly coupled to one or more display devices. Graphics processing may be performed in either the discrete graphics processor or the integrated graphics processor (but generally not both simultaneously), wherein the discrete graphics processor may be assigned to generate graphical output for applications requiring significant graphics processing resources. This decision may be performed automatically by the computing system (e.g., whenever the integrated graphics processor explicitly lacks the requisite graphical resources), or, alternatively, may be elected by the user. In configurations where the discrete graphics processor is not directly coupled to a display device, rendered graphical output produced by the discrete graphics processor may be temporarily stored in system memory, where it is retrieved by the integrated graphics processor and supplied to the display device.

In one embodiment, graphical output corresponding to an application executing on the computing system with multiple graphics processing subsystems may be generated by a first graphics processing subsystem. In further embodiments, the first graphics processing subsystem is a discrete or dedicated graphics processing unit (dGPU), communicatively coupled to the computing system through a communication interface such as a PCI-e or AGP interface. At step 101, the graphical output generated by the discrete graphics processing subsystem is monitored. According to some embodiments, the graphical output is monitored to determine the rate of the graphical output generated by the dGPU and displayed in a display device (via the integrated graphics processor or iGP). In one embodiment, the rate of the graphical output is determined by monitoring the rate at which frames of the graphical output is displayed in a display device (e.g., the "framerate"). In alternate embodiments, the rate of the graphical output is measured according to the rendering time required for each frame by the dGPU. Thus, for example, if the dGPU renders a frame at 10 milliseconds, (10 ms), a theoretical framerate of 100 frames per second (100 fps) may be achieved. Thus, in one embodiment, the monitored framerate may be a function of frames per second (fps), wherein alternate embodiments the monitored framerate may be a function of time per rendered frame of output.

If the rate of the output generated by the dGPU and monitored in step 101 ever exceeds a threshold (determined at step 103), the process continues on to step 105. Otherwise, the graphical output generated by the dGPU is continuously monitored at step 101. The threshold may be implemented as, for example, a minimum framerate (for embodiments wherein a framerate is monitored) or a maximum rendering time per frame (for embodiments wherein the time to render a frame is monitored). Thus, any time the framerate drops below a threshold framerate, or when rendering times for a frame exceed a threshold rendering time, may be detected at step 103. In one embodiment, the threshold used during step 103 may be default, pre-determined threshold. The default threshold may be configured by, for example, the specific application during application initialization. In embodiments wherein the monitored rate is the framerate, the default threshold may be synchronized with the refresh rate of the display device (e.g., monitor). In additional embodiments, the threshold may be user-configurable through a user interface offered through either the operating system of the computing system or the executing application.

If, at step 103, the monitored rate of the graphical output generated by the dGPU exceeds the pre-determined threshold (e.g., if the framerate drops below a minimum framerate or the time to render exceeds a maximum time to render), the resolution of the graphical output generated by the dGPU is adaptively reduced at step 105. Thus, for example, if the rate exceeds the threshold by a significant portion, (either a sizable drop in framerate between a sequences of frames is detected or the time to render a frame exceeds the threshold by a significant margin) the resolution may be reduced by a significant portion. Alternatively, if the rate of graphical output exceeds the threshold by a relatively insignificant portion, the resolution may be reduced by a relatively small amount, such that as much rendering detail may be preserved. Naturally, the reduction in generated resolution may have an adverse affect on the quality of the rendered frames. A sizable reduction in resolutions of successive frames will have a greater negative impact on the visual quality of the output relative to smaller reductions in resolutions. Thus, by adaptively modifying the resolution according to the graphical load, performance can be maintained while still preserving as much quality as possible.

In one embodiment, resolution is expressed having a vertical and horizontal component, representing a grid of pixels (e.g., 1280×1024 or 1920×1200, etc.) In one embodiment, reductions in resolution may be performed proportionally for both vertical and horizontal components, according to the ratio of pixels in the particular setting. In alternative embodiments, reductions in resolution may be performed disproportionately, whereby vertical pixel elements may be reduced at a higher ratio than horizontal pixel elements. Since the human eye typically has a greater sensitivity to changes in the field of vision along a horizontal plane, reducing the quality of the vertical plane may have less of an impact on the quality of the viewing experience.

At step 107, the graphical output generated to have a reduced resolution at step 105 by the dGPU is received in an iGP and scaled to the original resolution. Scaling the graphical output of the dGPU to the original resolution may be performed by, for example, bi or tri-linear filtering, wherein a sub sample of adjacent rendered output is used to extrapolate data used to "fill" in additional texels. In many embodiments, when the dGPU is generating graphical output, the iGP may not perform any graphical rendering operations, but simply ferries the rendered graphical output produced by the dGPU and stored in the system memory from the system memory to the display device.

At step 109, the output scaled by the iGP is displayed in the communicatively coupled display device. In further embodiments, as the rate of graphical output is continuously monitored, if the rate of graphical output no longer exceeds the particular corresponding threshold (e.g., the framerate is above the minimum framerate threshold or the rendering time per frame is below the maximum rendering threshold), full processing of the graphical output at the original resolution may be resumed by the dGPU, with the iGP ceasing scaling of the graphical output produced by the dGPU, until such a time as the threshold may be exceeded again.

Generating a Constant Framerate

Figure 2:
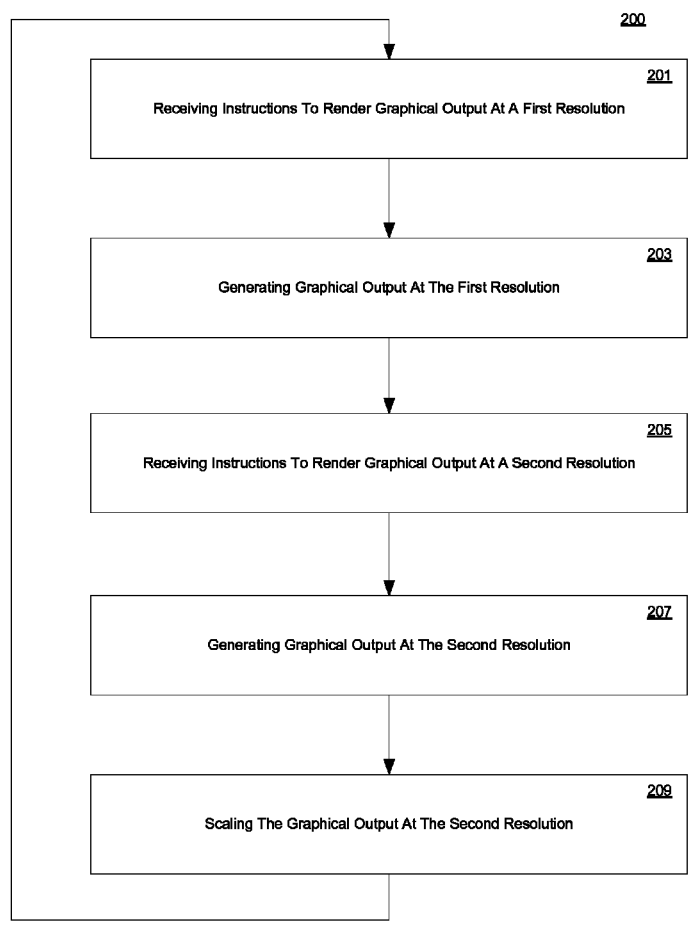
FIG. 2 depicts a flowchart of an exemplary computer controlled method for generating a constant framerate in a multi-graphics processor system, in accordance with various embodiments of the present invention.

FIG. 2 illustrates a flowchart of an exemplary method 200 for generating a constant framerate in a multi-graphics processor system, in accordance with embodiments of the present invention. Steps 201-209 describe exemplary steps comprising the process 200 in accordance with the various embodiments herein described. Process 200 may be performed in, for example, a system comprising one or more graphics processing subsystems, wherein one of the graphics processing subsystems is coupled to a plurality of display devices. In further embodiments, process 200 may be implemented as a series of computer-executable instructions.

At step 201, instructions to render graphical output for an application executing in a computing system configured with both a discrete graphics processing unit dGPU and an integrated graphics processor iGP is received in the dGPU. The instructions may be received from, the application through, for example, the device driver corresponding to the dGPU and the operating system. At step 203, graphical output is generated by the dGPU according to the graphics rendering instructions received at step 201. Once the graphical output is generated, the output may be stored in one or more frame buffers of the dGPU and eventually transferred into the computing system's system memory, where it is retrieved by the iGP and presented to an attached or otherwise communicatively coupled display device.

At step 205, the dGPU receives instructions to render the graphical output of the application at a second resolution. In one embodiment, instructions to render graphical output at a second resolution may be delivered in response to detecting a drop in performance of the rate of graphical output. Specifically, for example, if the framerate of the graphical output drops below a pre-determined framerate, or, if the rendering time required to render frames exceeds a pre-determined maximum rendering time, instructions may be given to maintain the framerate of graphical output displayed on the display device by reducing the resolution of the generated graphical output in the dGPU.

Alternatively, if the dGPU is already generating output at a reduced resolution and the framerate (or rendering time) no longer exceeds its respective threshold, instructions may be received at step 205 to render graphical output from the reduced resolution to the original resolution. Under these conditions, the process may skip step 209 and return directly to step 201. At step 207, the graphical output is generated at the resolution specified in the instructions received at step 205. Likewise, as in step 203, once the graphical output is generated, the output may be stored in one or more frame buffers of the dGPU and eventually transferred into the computing system's system memory, where it is retrieved by the iGP and presented to an attached or otherwise communicatively coupled display device.

Finally, at step 209, the graphical output is scaled from the second resolution (whose instructions were received at step 205) to the first resolution by the iGP. The graphical output may be subsequently displayed in a communicatively attached display device.

Exemplary Graphics Processing Subsystems

Figure 3:
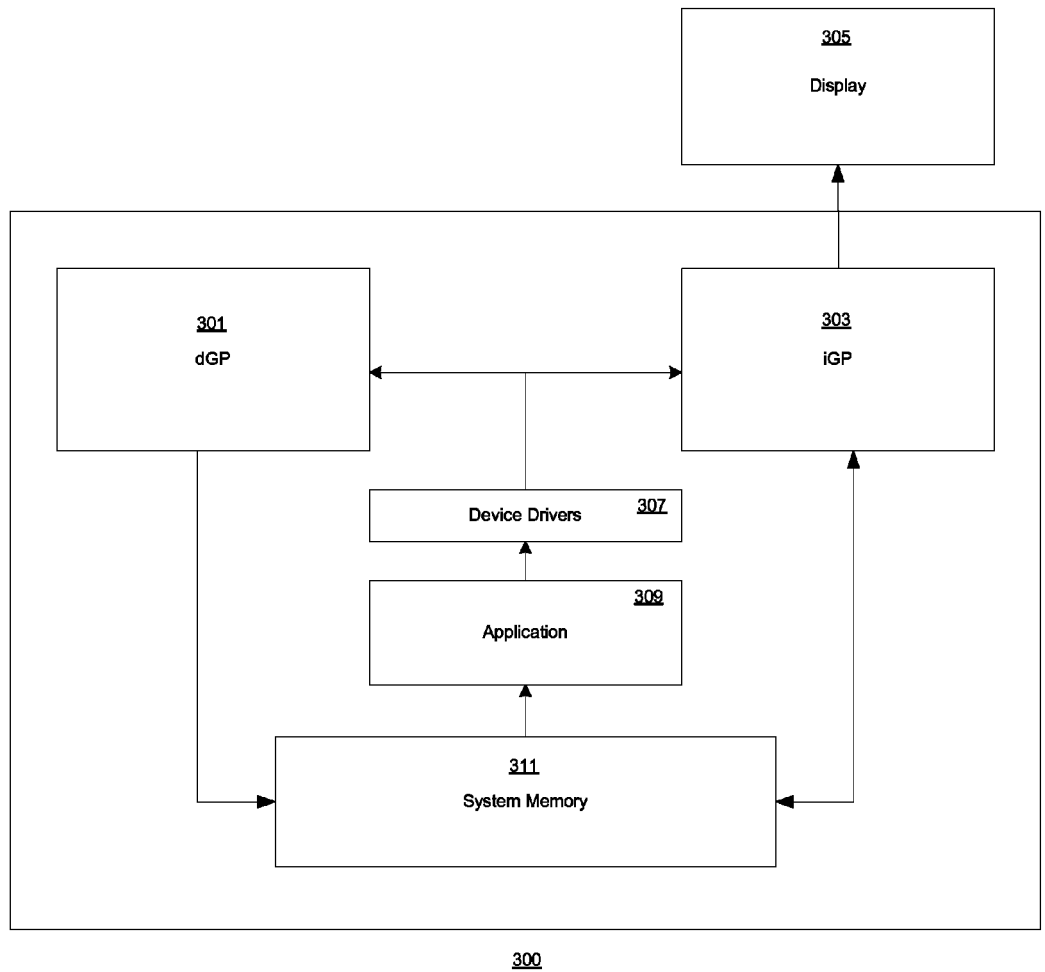
FIG. 3 depicts a data flow chart of an exemplary computing system comprising a plurality of graphics processing subsystems, in accordance with various embodiments of the present invention.

FIG. 3 depicts a data flow chart of an exemplary computing system 300 comprising a plurality of graphics processing subsystems, in accordance with embodiments of the present invention. As presented in FIG. 3, a discrete graphics processing unit dGPU 301 and an integrated graphics processor 303 are provided. As depicted, the integrated graphics processor 303 may be coupled to a display device (e.g., Display 305).

In a typical configuration, graphical output corresponding to an application 309 executing in the computing device 300 (e.g., through an operating system, for example) may be generated in either the dGPU 301 or the iGP 303. Typically, output requiring greater graphics resources may be assigned to the dGPU 301 to be generated. Specific graphics rendering instructions may be requested in the application 309, and delivered to either the dGPU 301 or the iGP 303 through corresponding device drivers 307. As depicted, the dGPU 301 may not be directly coupled to the display device (e.g., display 305). Under such configurations, graphically rendered output from the dGPU 301 may be stored in system memory 311. The output is retrieved by the iGP 303 and presented to the communicatively coupled display device 305.

According to some embodiments, the output of the dGPU 301 may be monitored to maintain a certain rate. For example, the output may be monitored to maintain a framerate above a threshold framerate. Alternatively, the framerate may be estimated from monitoring the rendering times between particular frames in the output. If the framerate drops below a predetermined threshold, the resolution of the output may be reduced adaptively such that a framerate above the threshold framerate is achieved. When the output with reduced resolution is received in the iGP 303, the output is scaled back to the original resolution by the iGP 303. Scaling may be performed by applying bi-linear or tri-linear filtering. Once scaled, the output is subsequently displayed in the display device 305. Accordingly, by employing the iGP 303 to scale graphical output at reduced resolutions, the graphical processing capabilities of the iGP 303 may be leveraged to create an efficient pipeline of graphical output where performance may be maintained with a relatively reduced loss in quality.

Exemplary Computing Device

Figure 4:
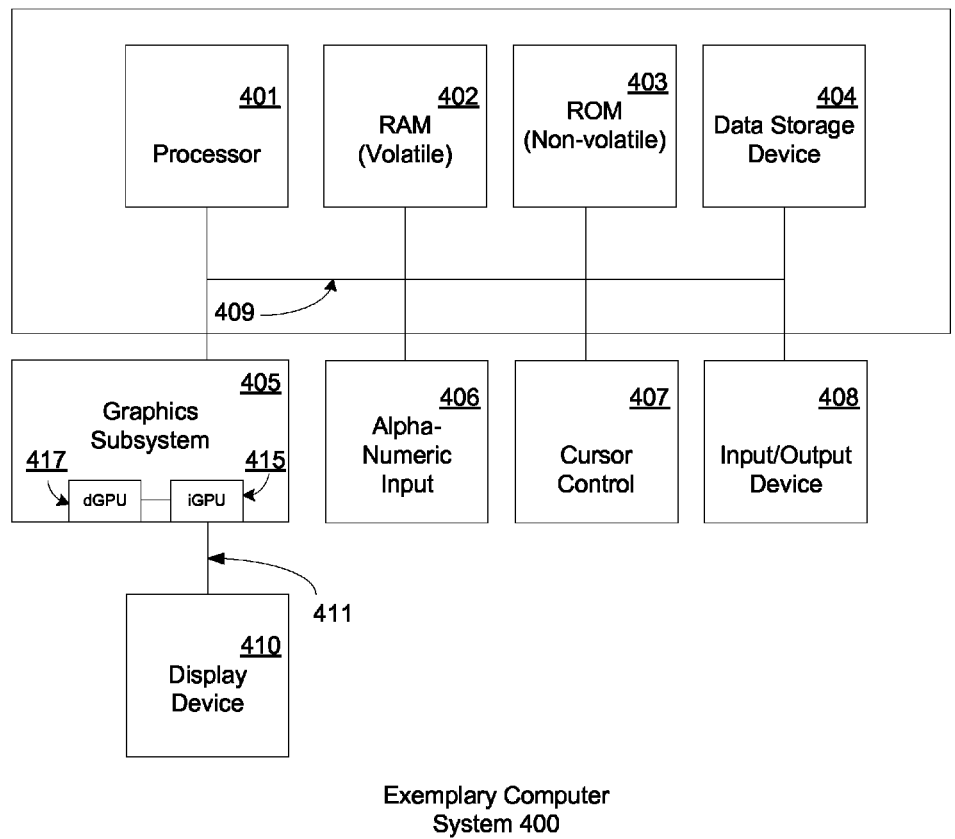
FIG. 4 depicts an exemplary computing system, in accordance with various embodiments of the present invention.

As presented in FIG. 4, an exemplary system upon which embodiments of the present invention may be implemented includes a general purpose computing system environment, such as computing system 400. In its most basic configuration, computing system 400 typically includes at least one processing unit 401 and memory, and an address/data bus 409 (or other interface) for communicating information. Depending on the exact configuration and type of computing system environment, memory may be volatile (such as RAM 402), nonvolatile (such as ROM 403, flash memory, etc.) or some combination of the two.

Computer system 400 may also comprise an optional graphics subsystem 405 for presenting information to the computer user, e.g., by displaying information on an attached display device 410, connected by a video cable 411. According to embodiments of the present claimed invention, the graphics subsystem 405 may include an integrated graphics processing system (e.g., iGP 415) coupled directly to the display device 410 through the video cable 411 and also coupled to a discrete graphics processing unit (e.g., dGPU 417). According to some embodiments, rendered image data may be communicated directly between the graphics processing systems (e.g., iGP 415 and dGPU 417) via a communication bus 409 (e.g., a PCI-e interface). Alternatively, information may be copied directly into system memory (RAM 402) to and from the graphics processing systems (e.g., iGP 415 and dGPU 417) also through the communication bus 409. In alternate embodiments, display device 410 may be integrated into the computing system (e.g., a laptop or netbook display panel) and will not require a video cable 411. In one embodiment, the processes 100 and 200 may be performed, in whole or in part, by graphics subsystem 405 in conjunction with the processor 401 and memory 402, with any resulting output displayed in attached display device 410.

Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by data storage device 404. Computer storage media includes volatile and nonvolatile, removable and non-removable media implemented in any method or technology for storage of information such as computer readable instructions, data structures, program modules or other data. RAM 402, ROM 403, and data storage device 404 are all examples of computer storage media.

Computer system 400 also comprises an optional alphanumeric input device 406, an optional cursor control or directing device 407, and one or more signal communication interfaces (input/output devices, e.g., a network interface card) 408. Optional alphanumeric input device 406 can communicate information and command selections to central processor 401. Optional cursor control or directing device 407 is coupled to bus 409 for communicating user input information and command selections to central processor 401. Signal communication interface (input/output device) 408, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal).

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for providing a constant framerate in a multi-graphics processor system, the method comprising:
    monitoring the rate of a graphical output generated by a first graphics processing system, the graphical output having a resolution;
    if the rate of the graphical output exceeds a threshold rate, reducing the resolution of the graphical output generated in the first graphics processing system from a first resolution to a second resolution;
    storing the graphical output in a frame buffer of the first graphics processing system;
    retrieving the graphical output from the frame buffer of the first graphics processing system in a second graphics processing system;
    scaling the graphical output generated in the first graphics processing system from the second resolution to the first resolution in the second graphics processing system; and
    displaying in a display device, the graphical output generated in the first graphics processing system and scaled in the second graphics processing system in a display device, wherein the first resolution is a higher resolution than the second resolution,
    wherein the first graphics processing system and the second graphics processing system are comprised in the same computing device.

2. The method of claim 1, wherein the rate of the graphical output is a function of framerate, and wherein the threshold rate is a minimum framerate.

3. The method of claim 1, wherein the rate of the graphical output is a function of rendering time per frame, and wherein the threshold rate is a maximum rendering time per frame.

4. The method according to claim 1, wherein the first graphics processing system is a discrete graphics processing system and the second graphics processing system is an integrated graphics processing system in a computing system comprising a plurality of graphics processing systems.

5. The method according to claim 1, further comprising:
detecting if the rate of the graphical output no longer exceeds the threshold rate;
in response to detecting the rate of the graphical output no longer exceeds the threshold rate, resuming generating of the graphical output in the first graphics processing system at the first resolution; and
terminating the scaling of the graphical output in the second graphics processing system.

6. The method according to claim 1, wherein the threshold is user-configurable.

7. The method according to claim 1, wherein the threshold comprises a default pre-determined threshold.

8. The method according to claim 1, wherein a resolution of the graphical output comprises a vertical component and a horizontal component, and wherein the reducing the resolution of the graphical output generated in the first graphics processing system from a first resolution to a second resolution comprises a reduction of a vertical component by a rate that is greater than a reduction of a horizontal component.

9. The method according to claim 1, wherein the scaling the graphical output comprises applying bi-linear filtering on the graphical output.

10. The method according to claim 1, wherein the scaling the graphical output comprises applying tri-linear filtering on the graphical output.

11. A method for generating a constant framerate in a multi-graphics processor system, the method comprising:
receiving, in a first graphics processing system, instructions to render graphical output at a first resolution;
generating graphical output in the first graphics processing system at the first resolution;
receiving instructions to render graphical output at a second resolution, the second resolution being lower than the first resolution;
generating graphical output in the first graphics processing system at the second resolution;
storing the graphical output in a frame buffer of the first graphics processing system;
retrieving the graphical output from the frame buffer of the first graphics processing system in a second graphics processing system; and
scaling the graphical output rendered by the first graphics processing system at the second resolution in the second graphics processing system,
wherein the first graphics processing system and the second graphics processing system are comprised in the same computing device.

12. The method according to claim 11, wherein the first graphics processing system is a discrete graphics processing system in a computing system comprising a plurality of graphics processing systems.

13. The method according to claim 11, wherein the second graphics processing system is an integrated graphics system in a computing system comprising a plurality of graphics processing systems.

14. The method according to claim 11, wherein the generating the graphical output in the first graphics processing system at the first resolution further comprises displaying the graphical output at a variable framerate.

15. The method according to claim 14, wherein the receiving the instructions to render the display at a second resolution is performed in response to detecting the variable framerate being below a pre-determined threshold.

16. A system for generating a constant framerate in a multi-graphics computing device, the computing device comprising:
a first graphics processing system for rendering graphical output;
a second graphics processing system for rendering graphical output;
a display device communicatively coupled to the second graphics processing system for displaying the graphical output;
a system memory, communicatively coupled to the first and second graphics processing systems for storing rendered graphical output for display on the display device;
a processor, coupled to the system memory, for executing an operating system;
a plurality of device drivers, comprised in the operating system, including a display driver corresponding to the display device and a graphics driver corresponding to the graphics processing unit; and
a plurality of applications hosted on the operating system,
wherein, the first graphics processing system renders graphical output for the plurality of applications at a first framerate and a first resolution and stores the graphical output in a frame buffer corresponding to the first graphics processing system,
wherein, in response to first framerate dropping below a threshold framerate, the first graphics processing system renders graphical output at a second resolution in lieu of the first resolution, the second resolution being a lower resolution than the first resolution, and
further wherein, graphical output rendered by the first graphics processing system at the second resolution and stored in the frame buffer is retrieved and scaled by the second graphics processing system to the first resolution.

17. The system according to claim 16, wherein the first graphics processing system is capable of higher graphics processing than the second graphics processing system.

18. The system according to claim 16, wherein graphical output rendered by the first graphics processing system is stored in system memory.

19. The system according to claim 18, wherein graphical output rendered by the first graphics processing system is retrieved from system memory by the second graphics processing system and displayed in the display device.

20. The system according to claim 16, wherein graphical output rendered by the first graphics processing system at the second resolution is scaled by the second graphics processing system using at least one of: bi-linear filtering and tri-linear filtering.

* * * * *